M. E. ADCOCK.
UNDERTAKER'S INSTRUMENT.
APPLICATION FILED OCT. 20, 1915.
1,195,169.
Patented Aug. 22, 1916.
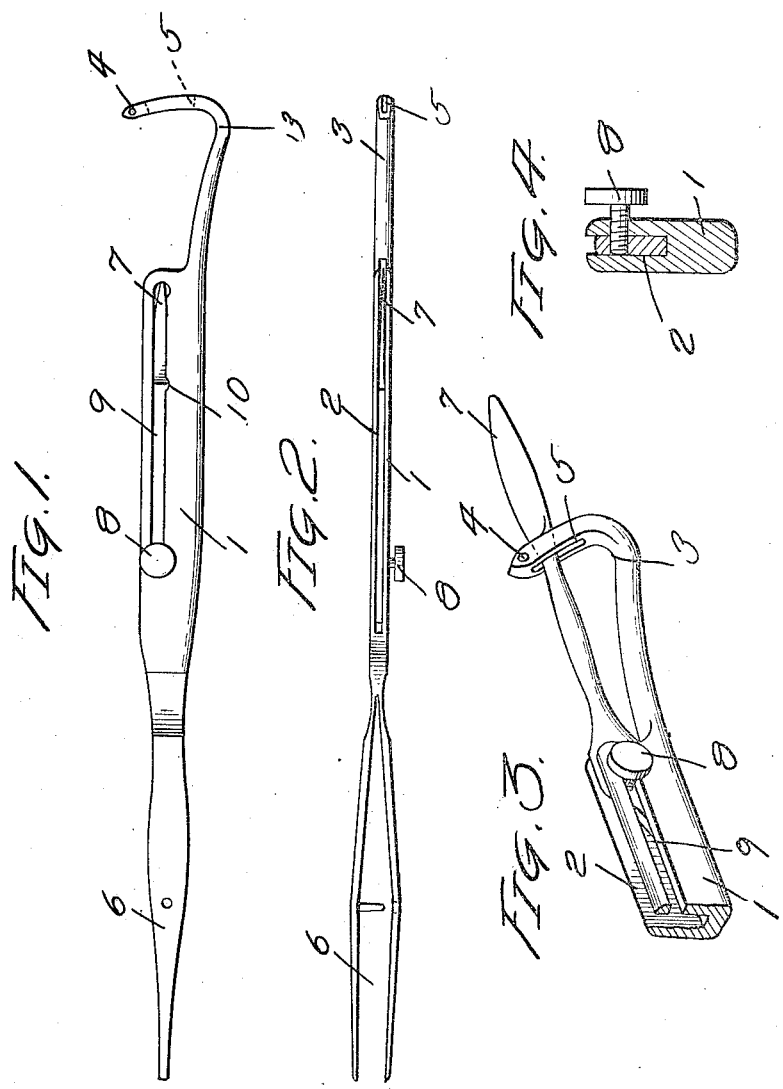

UNITED STATES PATENT OFFICE.

MARVIN E. ADCOCK, OF FRESNO, CALIFORNIA.

UNDERTAKER'S INSTRUMENT.

1,195,169. Specification of Letters Patent. Patented Aug. 22, 1916.

Application filed October 20, 1915. Serial No. 56,904.

*To all whom it may concern:*

Be it known that I, MARVIN E. ADCOCK, a citizen of the United States, residing at Fresno, in the county of Fresno, State of California, have invented certain new and useful Improvements in Undertakers' Instruments; and I do hereby declare the following to be a full, clear, and exact description of the invention, such as will enable others skilled in the art to which it appertains to make and use the same.

This invention relates to an undertaker's instrument.

An object of the invention resides in the provision of an instrument which will include a plurality of tools.

A further object of the invention resides in the provision of a knife blade which may be adjusted so as to be used to make the first incision in the skin and so that it may be used in cutting the flesh around the arteries.

With these and other objects in view, such as will appear as my description progresses, my invention comprises the combination and arrangement of parts as set forth in and falling within the scope of the appended claims.

In the drawing: Figure 1 is an elevational view of a device constructed in accordance with my invention; Fig. 2 is a view taken at right angles to Fig. 1; Fig. 3 is a perspective view of a portion of the device showing the blade in the position it will occupy when the first incision is made, and Fig. 4 is a sectional view showing the securing screw for the blade.

Referring to the drawing by reference characters wherein like parts are indicated by like characters throughout the several views:

In the embodiment of the invention shown in the drawing, I have illustrated a shank 1 which is provided with a longitudinally extending chamber 2. On one end of the shank, a hook shaped member 3 is formed, through the end of which there is a hole 4. A slot 5 is formed in this hook shaped member 3 for a purpose which will later appear. On the opposite end of the shank a pair of tweezers 6 are formed. Slidably mounted in the chamber 2 is a knife blade 7 on which a thumb screw 8 is adjustably mounted, which screw extends through a slot 9 in the shank 1 and is adapted to bind the said blade 7 in various positions. The slot 9 is provided with an offset portion 10 which is adapted to receive the thumb screw 8. When the said screw is located in the offset 10 the end of the knife blade 7 is located in the slot 5.

In using the device, when it is desired to make the first incision in the skin, the blade is moved so as to extend beyond the end of the hook shaped member 3 in the position shown in Fig. 3 of the drawing. After this incision has been made and it is desired to cut the flesh from around the arteries and veins in a body, the set screw is loosened and the blade moved to a position so that the end will be located in the slot 5. At this time the flesh around the arteries and veins may be successfully cut and yet the blade will be prevented from cutting any other portions of the body. When it is desired to place a piece of thread around blood vessels, the blade is moved entirely within the chamber 2 and secured therein by the setscrew. At this time the thread may be placed through the hole 4 in the end of the hook-shaped member 3 so that when the said hook shaped member is passed around the blood vessel the thread will be carried with it.

From the foregoing description it will be seen that I have provided a simple and efficient device which will be exceedingly useful and easy to operate.

While I have illustrated and described a particular embodiment of my invention, it has merely been for the sake of convenience and I do not wish to be limited to that particular embodiment as it is obvious that numerous changes may be made within the scope of the appended claims.

What I claim is:—

1. In a device of the class described, the combination with a shank having a hook shaped member on one end thereof, of a knife blade slidably mounted in said shank and movable through an opening in the hook shaped member and means for securing the blade in a plurality of positions.

2. In a device of the class described, the combination with a shank having a hook shaped member on one end thereof in the end of which a hole is formed, of a knife mounted in said shank and bridging the space between the shank and the bill of the hook, the cutting edge of the blade being arranged on one side thereof.

3. In a device of the class described, a shank having a hook shaped member on one end thereof adapted to carry a piece of thread so that the latter may be passed about a blood vessel in a body, and a blade adjustably mounted in said shank, the said blade being movable so that its end will project through and beyond the bill of the hook or so that the end may be located in an opening in the said bill.

4. In a device of the class described, the combination with a body portion having a hook on one end thereof, of a knife adjustably mounted on the body portion and adapted to extend from the body portion to close the hook in such manner that the cutting edge of the knife will be exposed at the open side of the hook.

5. In a device of the class described, the combination with a body portion having a hook on one end thereof, of a knife adjustably mounted in the body portion and including a shank and a blade, the said blade being movable to close the hook at which time the shank will be located in the body portion and the blade being also movable to extend through and beyond the bill of the hook, at which time the shank will close the hook.

6. In a device of the class described, the combination with a body portion, of a knife adjustably mounted therein and adapted to extend from one end thereof, the said body portion having a hook-shaped guard for the knife on the end thereof, which guard is arranged to be used as a thread carrying member when the knife is retracted in the body portion.

In testimony whereof, I affix my signature, in the presence of two witnesses.

MARVIN E. ADCOCK.

Witnesses:
J. N. LISLE,
FLORENCE R. MOORE.

Copies of this patent may be obtained for five cents each, by addressing the "Commissioner of Patents, Washington, D. C."